June 1, 1965　　　HANS-JOACHIM DAMES　　　3,186,457
MACHINE FOR PEELING PRODUCE

Filed March 1, 1963　　　　　　　　　　　　2 Sheets-Sheet 1

Inventor:
HANS JOACHIM DAMES
By Hane and Nydick
ATTORNEYS

June 1, 1965 HANS-JOACHIM DAMES 3,186,457
MACHINE FOR PEELING PRODUCE
Filed March 1, 1963 2 Sheets-Sheet 2
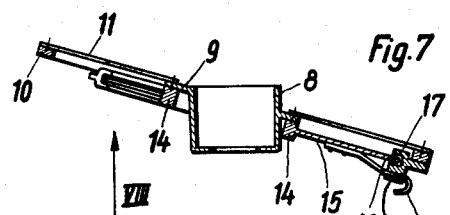
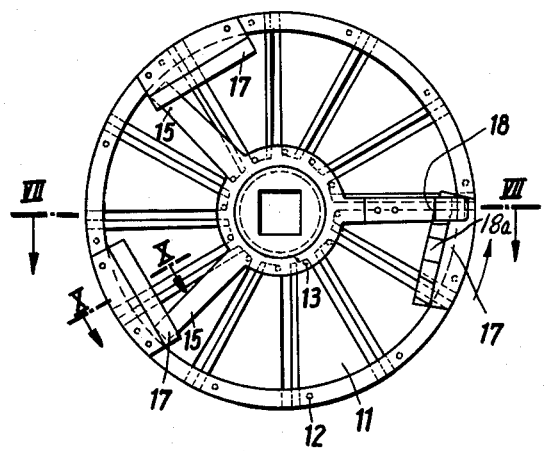
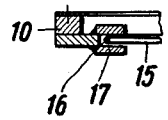
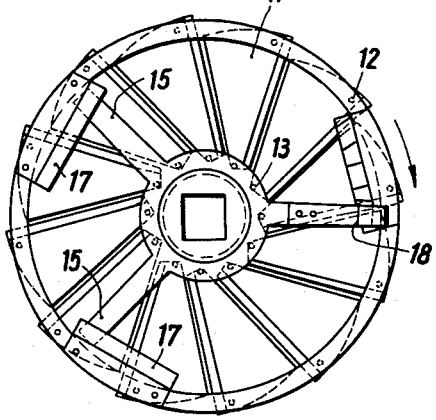
Inventor:
HANS JOACHIM DAMES
ATTORNEYS

United States Patent Office 3,186,457
Patented June 1, 1965

3,186,457
MACHINE FOR PEELING PRODUCE
Hans-Joachim Dames, Bahnhofstrasse 286,
Lispenhausen, near Bebra, Germany
Filed Mar. 1, 1963, Ser. No. 262,163
10 Claims. (Cl. 146—43)

The present invention relates to machines for peeling produce, such as potatoes.

There are known potato peeling machines which comprise a stationary peeling insert mounted on the side wall of a housing and a rotary peeling disk mounted at the bottom of the housing. The insert and the disk are coated with an abrasive layer such as a carborundum layer, or are provided with roughened holes in the manner of a grater customarily used as a household appliance.

Potatoes or other produce to be peeled often carry rests of soil into the housing of the machine. Such soil and other impurities tend to clog the peeling components of the machine and particularly to smooth the abrasive layers thereof so that these components must be cleaned or replaced at inconveniently frequent intervals.

Another disadvantage of peeling machines as heretofore known, both the kind using abrasive surfaces and the kind using grater-like peeling components, is that the peeled produce has a rough surface and is thus unattractive in appearance. The trade, and particularly consumers, want a machine capable of substantially duplicating the smooth surface of hand-peeled potatoes or other produce. It is also desirable to be able to adjust the thickness of the peels, depending upon the type of produce involved. Machines as now known do not provide for such adjustment.

It is broad object of the invention to provide a novel and improved produce-peeling machine of the general kind above referred to which substantially duplicates the smooth surface of hand-peeled produce.

A more specific object of the invention is to provide a novel and improved produce-peeling machine in which peeling is effected by knife blades rather than by abrasive or grating surfaces.

Another more specific object of the invention is to provide a novel and improved produce peeling machine which is more efficient and economical in operation than machines as heretofore known in that the peeling components of the machine need to be cleaned or replaced only at long intervals.

A further object of the invention is to provide a novel and improved produce-peeling machine in which the cutting angle of the peeling knives can be conveniently adjusted in accordance with the desired thickness of the peels.

The aforementioned objects, features and advantages and other objects, features and advantages which will be pointed out hereinafter are attained by providing in a housing of the machine an insert mounting knives on its side wall and a rotary peeling disk at the bottom of the housing also mounting knives. Both the knives on the side wall and on the peeling disk are preferably adjustable as to the cutting angle thereof.

According to a further aspect of the invention the knives on the peeling disk are tiltably mounted to vary the cutting angle of the knife by changing the angle of tilt. To permit such tilting of the knives, the same are secured at diagonally opposite corners of the knife blades to two concentric and substantially co-planar rings, one of which is rotatable in reference to the other one. The inner ring is preferably the one used for adjusting the knife tilt and is provided for the purpose with radially extending arms each slidably guided at its free end in an adjustment member secured to the outer ring. An actuating device secured to one of the radial arms permits a convenient turning of the inner ring into a selected one of several predetermined angular positions in reference to the outer ring, thereby correspondingly tilting the knife blades in reference to the plane of the rings.

In the accompanying drawing several preferred embodiments of the invention are shown by way of illustration and not by way of limitation.

In the drawing:

FIG. 7 is a sectional view of a modification of the rotary bottom disk of the machine taken on line VII—VII of FIG. 8.

FIG. 8 is a bottom view of FIG. 7 seen in the direction of arrow VIII.

FIG. 9 is a bottom view similar to FIG. 8, but showing the knives on the disk in different angular adjustment, and FIG. 10 is a section taken on line X—X of FIG. 8.

Figure 1:
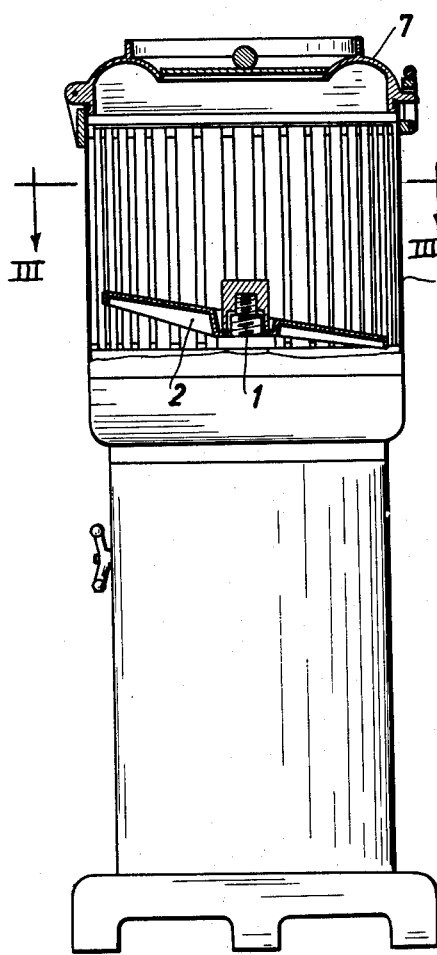
FIG. 1 is an elevational view, partly in section, of a potato peeling machine according to the invention.

Referring first to FIGS. 1 through 6 in detail, the lower part of the machine shown in FIG. 1 should be visualized as containing a drive motor, a control means for controlling the motor and such other items as may be useful in connection with the operation of the machine, for instance spare parts. The lower part of the machine and all components therein should be visualized as being conventional and do not constitute part of the invention.

A generally cylindrical housing 4 is mounted on the top of the lower part of the machine. The top side of the housing may be opened and closed by a pivotal cover 7 which can be locked to the housing by suitable clamping means.

Figures 4, 5:
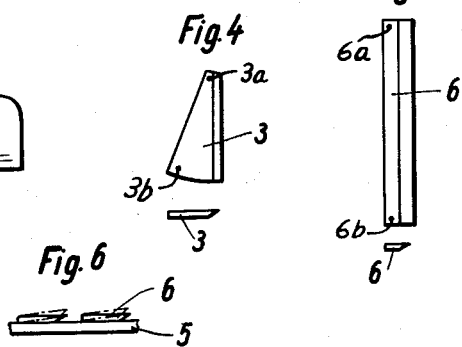
FIG. 4 is an elevational and plan view respectively of one of the knives mounted on the rotary disk.
FIG. 5 is an elevational and plan view respectively of the kind of knife mounted on the side wall of the peeling insert of the machine.

A shaft butt or shaft end 1 protrudes into housing 4 from the bottom side thereof. Shaft 1 should be visualized as being driven and controlled by the drive motor in the lower part of the machine and supports a rotary peeling disk 2 which is mounted in the manner of a swash plate. Disk 2 mounts radially disposed and angularly adjustable cutting knives 3. As is shown in FIG. 4, each cutting knife is in the form of a narrow sector and secured to the disk 2 at diagonally opposite corners 3a and 3b. The knives 3 can be slightly tilted about mounting points 3a and 3b by more or less tightening the knife mountings to vary the cutting angle of the knives.

Figure 2:
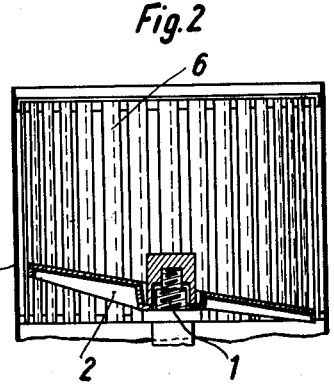
FIG. 2 is a sectional view of the peeling insert of the machine.
Figure 3:
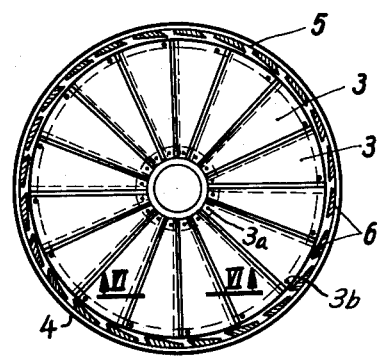
FIG. 3 is a section taken on line III—III of FIG. 1.
Figure 6:
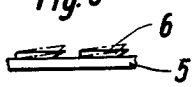
FIG. 6 shows diagrammatically the manner in which the knives according to FIG. 5 may be adjusted as to the cutting angle.

The peeling insert, as shown in FIG. 2, comprises a generally cylindrical sleeve 5 on the inside of which a plurality of sector-shaped knife blades 6 are mounted in lengthwise parallel arrangement. These blades are held at mounting points 6a and 6b and can also be adjusted in respect to their cutting angle similarly to knives 3, as is indicated in FIG. 6 by dotted lines.

The mode of operation of the machine is self-evident. Potato or other produce fed into the machine will be tumbled by swash disk 2 and while being so tumbled will be peeled by knives 3 and 6 with which they come into frequently repeated cutting contact.

Turning now to FIGS. 7 through 10, the peeling disk according to these figures comprises a bearing sleeve 8 which is fitted in a suitable manner upon the drive shaft 1 so that the disk functions in the manner of a swash plate.

The disk assembly includes an inner ring 9 and an outer ring 10 disposed concentrically and substantially coplanar. The knives 11 are again generally sector-shaped and are mounted on the inner and outer ring at diagonally opposite corners as indicated at 12 and 13. As may be noted, the mounting at corner 13 is the circumferentially forward one when the disk is rotated in the direction indicated in FIG. 8 by an arrow. The two rings are angularly adjustable in reference to each other and preferably the inner ring is adjustable in reference to the outer ring. To effect such adjustment, a control ring 14 is secured to inner ring 9 at the bottom side thereof. Ring 14 mounts one or several radially disposed arms 15. The free end 16 of each arm is slidably guided in a guide track 17 secured to outer ring 10. There are shown in FIGS. 8 and 9 three arms 15 and accordingly also three guide tracks 17. The circumferential length of each guide track is selected in accordance with the desired angular adjustability of knives 1.

To effect setting of ring 9 into a selected one of several predetermined positions, a detent is provided. This detent comprises a spring 18 secured to one of the arms 15 and engageable with one of several circumferentially spaced indentations 18a in the corresponding guide track 17.

As is evident, displacement of arms 15 in the guide tracks will tilt all the blades about their mounting points 12 and 13.

FIG. 8 shows one limit position of possible tilt and FIG. 9 shows the other limit position of possible tilt. As it is evident and clearly shown in FIG. 9, tilting of the blades is effected in reference to general radial plane defined by the knives. As it is also evident, the thickness of the peel can be readily controlled by varying the position of tilt and hence the angle of cutting of the segments.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A device for peeling produce comprising a housing for receiving the produce to be peeled therein, a peeling sleeve-shaped insert fitted in said housing and mounting on its inside wall a plurality of knife blades, the cutting edges of the blades extending lengthwise of the insert in parallel array, a rotatably mounted peeling disk at the bottom of the housing, and a plurality of knife blades mounted in generally radial arrangement on the side of said disk facing the knives of the peeling insert.

2. A device for peeling produce comprising a housing for receiving the produce to be peeled therein, a peeling sleeve-shaped insert fitted in said housing, said insert including a plurality of knife blades mounted on the inside wall of the insert, the cutting edges of the blades extending across the length of the insert in parallel array, a drive shaft protruding into the housing and the insert through the bottom of the housing, a peeling disk mounted on said drive shaft for rotation as a swash plate and a plurality of knife blades mounted in generally radial arrangement on the side of the swash plate facing the knives of said insert.

3. A device according to claim 1 wherein said knives on the insert and said knives on the peeling disk are adjustable in reference to said side of the disk.

4. A device according to claim 1 wherein adjustment means are provided for adjusting the cutting angle of the knives mounted on the peeling disk.

5. A device according to claim 4 wherein said adjustable knives are mounted tiltable about a lengthwise axis of the knives so as to vary the cutting angle thereof.

6. A device according to claim 5 and also comprising mounting means for mounting said knives, said knives being secured to said mounting means at radially opposite and circumferentially spaced corners of the knives, and manually operable means for simultaneously tilting all the knives on the peeling disk, each knife in its own plane, thereby changing the effective cutting angles of the knives.

7. A device according to claim 6 wherein said mounting means comprise two concentric and substantially coplanar rings to which the radially inner and outer corners of said knives are secured, one of said rings being rotatable in reference to the other, and wherein said tilting means engage the rotatable ring for rotating said ring thereby to tilt said knives.

8. A device according to claim 7 wherein the inner ring is rotatable, and wherein said tilting means comprise arms extending radially from said inner ring and guide means, one for each arm, secured to the other ring, the free end of each arm being circumferentially and slidably guided in the respective guide means whereby circumferential displacement of the arms in said guide means causes tilting of the knives.

9. A device according to claim 8 and further comprising detent means on the outer ring and one of said arms for releasably retaining the inner ring in a selected angular position of one of several predetermined positions.

10. A device according to claim 9 wherein said detent means comprise a spring secured on said one arm and several circumferentially spaced indentations on said guide means, said spring being engageable with a selected one of said indentations.

References Cited by the Examiner
UNITED STATES PATENTS

| | | | |
|---|---|---|---|
| 302,993 | 8/84 | Frost | 146—167 X |
| 1,886,061 | 11/32 | Speidel. | |
| 1,945,978 | 2/34 | Palombo et al. | |
| 3,001,561 | 9/61 | Van Raay | 146—43 |

J. SPENCER OVERHOLSER, Primary Examiner.